United States Patent [19]
Conrad

[11] 3,792,313
[45] Feb. 12, 1974

[54] TIMING CONTROL CIRCUIT FOR SOLID STATE PROTECTIVE RELAYS FOR PROVIDING NOVEL CONTROL OF THE PICKUP AND TIMING CIRCUITS PROVIDED THEREIN

[75] Inventor: Richard Conrad, Levittown, Pa.
[73] Assignee: I-T-E Imperial Corporation, Philadelphia, Pa.
[22] Filed: Oct. 2, 1972
[21] Appl. No.: 293,913

[52] U.S. Cl. ............ 317/27 R, 317/36 TD, 317/38, 317/141 S
[51] Int. Cl. ............................................ H02h 3/08
[58] Field of Search .... 317/36 TD, 38, 27 R, 141 S, 317/49, 50; 307/141.4

[56] References Cited
UNITED STATES PATENTS
3,644,789   2/1972   Simpson ........................ 317/141 S
3,434,011   3/1969   Zocholl ......................... 317/36 TD Primary Examiner—A. D. Pellinen
Assistant Examiner—Harvey Fendelman
Attorney, Agent, or Firm—Ostrolenk, Faber, Gerb & Soffen

[57] ABSTRACT

A static relay having sensing, reference, pickup and timing circuits and comprising a novel timing control circuit. The pickup circuit functions to initiate operation of the timing circuit when a predetermined threshold level of overload conditions exist. The novel timing control circuit functions to prevent the timing circuit from being reset due to momentary dips below the aforesaid threshold level while providing means for rapid reset of the timing control circuit when the input being monitored remains below the threshold.

4 Claims, 2 Drawing Figures

TIMING CONTROL CIRCUIT

TYPICAL ASSOCIATED CIRCUITS

INPUT CIRCUITS | REFERENCE CIRCUIT | TIMING CONTROL CIRCUIT | TIMING CIRCUIT

TIMING CONTROL CIRCUIT FOR SOLID STATE PROTECTIVE RELAYS FOR PROVIDING NOVEL CONTROL OF THE PICKUP AND TIMING CIRCUITS PROVIDED THEREIN

The present invention relates to a static relay and more particularly to a static relay employing a novel timing control circuit between the pickup circuit and the inverse time delay circuit to prevent reset of the inverse and time delay circuit due to momentary dips of the condition being monitored below a preset threshold level, while at the same time providing means for rapid reset of the timing control circuit when the condition being monitored remains below the threshold level.

BACKGROUND OF THE INVENTION

The use of static relays in the field of power transmission and distribution has increased rapidly in recent years due to the advantageous characteristics of such relays namely their solid state nature thereby eliminating any moving mechanical parts and their long useful operating life. One such typical design presently in use is described in U.S. Pat. No. 3,319,127, assigned to the assignee of the present application. The static relay described therein is basically comprised of a circuit for sensing the condition being monitored and converting same to a d.c. level; a trip circuit for activating protective equipment such as, for example, a circuit breaker; a timing circuit causing operation of the trip circuit in accordance with an inverse time current relationship depending upon the magnitude of the overload condition sensed; and a pickup circuit for initiating operation of the timing circuit only after the condition being monitored passes a predetermined threshold level. The desired characteristics of such a static relay are such that the timing circuit must be maintained at a reset or zero level condition when the condition being monitored is below the designated threshold level. Once the threshold level is achieved, however, the timing element must be free to initiate its timing operation without being influenced by the control of the pickup circuit. As a further requirement, the timing circuit must be capable of ignoring or overriding momentary dips below the threshold level, while being capable of resetting quickly if the input remains below the threshold level. Since momentary dips below the threshold level will occur at regular intervals due to the nature of the output of d.c. rectified circuits, it is conventional to employ filter circuits for the purpose of smoothing and filtering the half or fullwave rectified signals so as to eliminate such momentary dips. This technique significantly increases the cost of the static relay and further significantly decreases the single phase to three phase response of the circuit and provides increased time lag in the sensing of the removal of an overload condition.

BRIEF DESCRIPTION OF THE PRESENT INVENTION

The present invention is characterized by providing a novel reset time delay circuit which permits the timing circuit to continue its timing function and thereby ignore or override momentary dips in the condition being monitored below the designated threshold level, while at the same time providing rapid reset of the timing circuit when the condition being monitored remains below the threshold level and which further provides good single phase to three phase response without the need for filtering techniques heretofore employed in conventional static relays.

It is therefore one object of the present invention to provide a novel reset time delay circuit for use in static relays and the like which enables the timing element of the static relay to distinguish between momentary dips below a designated threshold level of the condition being monitored and substantially lengthy drops below the threshold level so as to provide for positive as opposed to erratic operation of the static relay and permit the timing element to be rapidly reset during those instances in which the condition being monitored remains below the designated threshold level.

BRIEF DESCRIPTION OF THE FIGURES

The above as well as other objects of the present invention will become apparent when reading the accompanying description and drawings in which.

DETAILED DESCRIPTION OF THE FIGURES

Summarizing the pertinent characteristics of a static relay such as, for example, protective relays of the overcurrent type, the necessary function is the control of the timing element. In response to inputs through the relay below a designated threshold level, the timing element must be held in a "reset" or zero condition. In response to input levels above the threshold level, the timing element must be released to allow a time delay interval to begin. This time delay interval is a function of the design of the timing element and should not be influenced by the control element. However, if the input condition being monitored falls below the threshold, operation of the timing element must be terminated and the timing element reset to the zero condition.

As a further requirement, the timing control must override the momentary dips in the condition being monitored below the threshold level and yet be capable of resetting quickly when the input remains below the threshold.

Figure 1:
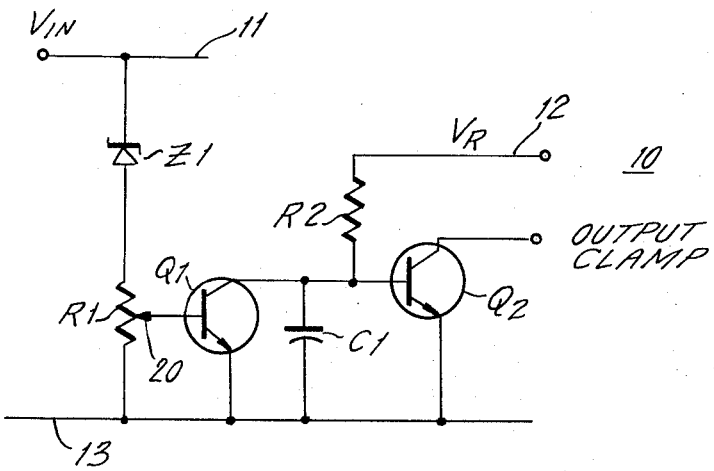
FIG. 1 is a schematic diagram of a timing control circuit designed in accordance with the principles of the present invention.

FIG. 1 shows a circuit 10 especially advantageous for use with solid state overcurrent relays of the type employing resistor capacitor timing elements and exhibiting the function described hereinabove.

The circuit 10 of FIG. 1 provides four basic functions, namely;

1. Level detection (elements Z1 and R1);
2. Reset clamping (transistor Q1);
3. Reset time delay (elements R2 and C1); and
4. Output clamping (transistor Q2)

Bus 11 constitutes the line for receiving the d.c. output voltage representing the condition being monitored and bus 12 is coupled to the reference potential (as will be more fully describd hereinbelow) for establishing a voltage source for the operation of transistor Q2.

At any input current below the threshold, transistor Q1 will be "off" since the voltage at its base electrode will be below the required turn-on level. Transistor Q2 will then be biased "on" by current flow through resistor R2. Capacitor C1 will have charged to a steady state voltage equal to the base-to-emitter ($V_{BE}$) of transistor Q2 (typically about 0.60 volts). In timing elements such as a capacitor connected to the collector of Q2 would therefore be clamped to a "zero" state (i.e. fully discharged).

When the input to the base of Q1 is equal to or greater than the threshold, the voltage divider circuit of zener diode Z1 and adjustable resistor R1 provides a forward bias to Q1 which, in turn, shunts the bias current from the base of Q2. With Q2 now "off", the timing element coupled thereto (as will be more fully described) is released and allowed to charge toward a trigger level to cause tripping of a circuit breaker.

Upon removal of the input or upon reduction of the input below the designated threshold level, Q1 turns "off" and R2 and C1 provide a short time delay for resetting the timing element by controlling the time for the $V_{BE}$ to reach the forward bias point of Q2. This allows the circuit to remain "on" between the adjacent peaks of an a.c. current and also for momentary dips below the threshold level.

Figure 2:
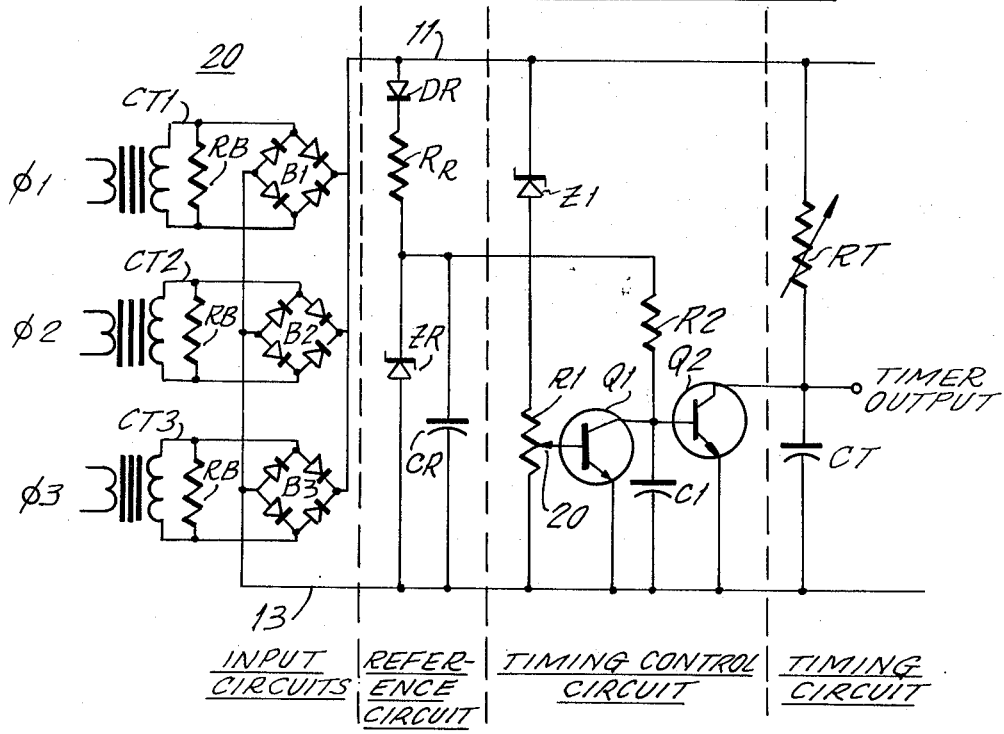
FIG. 2 shows a static relay structure employing a timing control circuit of the type shown in FIG. 1.

FIG. 2 shows a simplified version of a static relay employing the circuit of FIG. 1. In the embodiment of FIG. 2, the individual circuits are all capable of being operated by a voltage derived from the input current such as the current transformers CT1 – CT3, each of which is inductively coupled to the lines of the phases $\phi 1-\phi 3$, respectively. Burden resistors $R_B$ develop a voltage at the output of the current transformers which is impressed upon associated full-wave bridge rectifier circuits $B_1-B_3$, respectively. The outputs of the bridge rectifier circuits are coupled in common across buses 11 and 13 in the manner shown (also note FIG. 1). The d.c. voltage developed across buses 11 and 13 is then utilized as a measure of the input magnitude.

The timing control threshold is determined by the choice of values for zener diode Z1 and resistor R1. Zener diode Z1 is chosen such that, at its highest tolerance, it is "on" somewhat below the threshold level. Variable resistor R1 which is provided with slidable tap 20 is then set to provide a forward bias voltage to Q1 when the threshold level is reached.

Indefinite operation will exist only within a narrow band of input levels just below the threshold level. Through this region, transistor Q1 progresses from the fully "off" state to the fully "on" state. In the design of the present circuit, this region is less than 0.25 percent of the threshold level, thus allowing very good precision for the timing control function.

As a further consideration, the upper resistance portion of resistor R1 should provide current limiting to the base of Q1 at maximum input levels.

The transistor Q1 is not required to exhibit any special properties and therefore any ordinary npn transistor may be employed. For a recitfied sine-wave signal, Q1 will be turned "on" and then "off" during each half-cycle of input. Switching will occur at the rising and falling portions of the sine-wave which correspond to the desired threshold level. Capacitor C1 is thereby discharged to zero during a portion of each half-cycle of input above the threshold level.

When Q1 turns "off", the voltage on C1 begins to rise on an exponential curve at a rate determined by the time constant of R2 and C1. By choosing the time constant such that the forward bias point of Q2 can not be reached in the time between the half-cycle peaks of the input, the clamp (Q2) will be held "off" as long as Q1 is switching "on" during each half-cycle. Thus, the timing clamp output will remain released as long as the current input exceeds the threshold level.

For practical situations with signals at an operating frequency of 60 Hertz, a reset time delay of about 20 milliseconds is as fast as is normally desirable.

It should be noted that R2 must be chosen to provide sufficient base drive to the base of Q2 in order to quickly discharge the timing capacitor load when reset is initiated after a time delay has been started, but not completed.

This manner of operation completely eliminates any variations between single phase and three phase inputs. It should also be noted that this circuit can instantly detect the removal of an overload and initiate timing reset.

These features show a distinct advantage over present day static relays which typically require a smooth d.c. voltage derived from the peaks of the input. Such a circuit, for example, as shown in the above mentioned U.S. Pat. No. 3,319,127, requires more components and is more costly than the circuit of the present application. Filtered circuits always must be compromised between good single phase to three phase response and the time lag to sense the removal of an overload. For the former consideration, very good filtering is required since the circuit actually responds to the valleys in a fullwave rectified signal as well as the valleys of the filter ripple. In the latter consideration, the optimum circuit would have no filtering.

In the circuit of the present invention, both of these functions are separate and independent in that no filtering is employed to yield excellent response regardless of single phase or three phase operation and there is no lag in the time to sense a removal of an overload condition as a result of the elimination of the filtering elements which further results in an accompanying significant reduction in cost.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Static relay means for use in protecting power transmission and/or distribution systems against overload conditions comprising:
   first means for sensing the current in the system being protected;
   second means coupled to said first means for converting the output of said first means into a d.c. voltage level respresentative of the current in the system being protected;
   timing means coupled to said second means for generating a predetermined output level after a time interval, which time interval is inversely proportional to said d.c. level;
   third means coupled to said second means for establishing a constant reference level which is substantially independent of the d.c. output level of said second means;
   fourth means having an output coupled to said timing means and being activated at its input for resetting said timing means to a zero voltage level in the sustained absence of an overload condition in the system being monitored;

fifth means having at least one input terminal and an output, said input terminal coupled to said second means and said output coupled to the input of said fourth means for activating said fourth means to operate said timing means when the output level of said second means is greater than a predetermined threshold level (pick-up);

sixth means coupled in common to said third means and the input of said fourth means for preventing deactivation of said fourth means when the output of said second means momentarily falls below said threshold level to permit continued operation of said timing means once said fourth means has been inactivated to enable said timing means to continue its timing function;

said timing means including at least one capacitor;

said fourth means including first transistor means having first and second terminals coupled across said timing means and input means for rendering said transistor means non-conductive when said fourth means is activated;

said fifth means comprising second transistor means having its output terminal coupled to said third means and the input of said first transistor means and being conductive when said threshold level exceeds the instantaneous output level of said second means for activating said first transistor means to reset said timing means;

a series connected zener diode means and adjustable resistor means coupled across said second means;

said adjustable resistor means including a wiper arm connected directly to a control electrode at the input of said second transistor means;

said zener diode means being adapted to conduct when the level developed by said second means is nearly equal to or greater than said threshold level;

said adjustable resistor means including a portion between said zener diode means and the input of said second transistor means, with such portion having resistance value selected to limit the current drawn by said second transistor means to a safe operating value.

2. The device of claim 1 wherein said sixth means comprises second capacitance means for delaying activation of said fourth means until the output of said second means drops below said threshold level for a predetermined time interval to prevent resetting of said fourth means due to momentary dips in the output level of said second means below said threshold level.

3. The device of claim 1 wherein said system comprises a single phase line being monitored;

said first means comprising a current sensor inductively coupled to said line;

said second means comprising a full wave bridge recitifier.

4. The device of claim 1 wherein said system comprises a three phase line being monitored;

said first means comprising a current sensor for each phase inductively coupled to its associated line;

said second means comprising a full wave bridge rectifier for each line.

* * * * *